INVENTORS
ROSS A. McCLINTOCK
RAYMOND E. THOMPSON
BY KENNETH E. WAGGENER

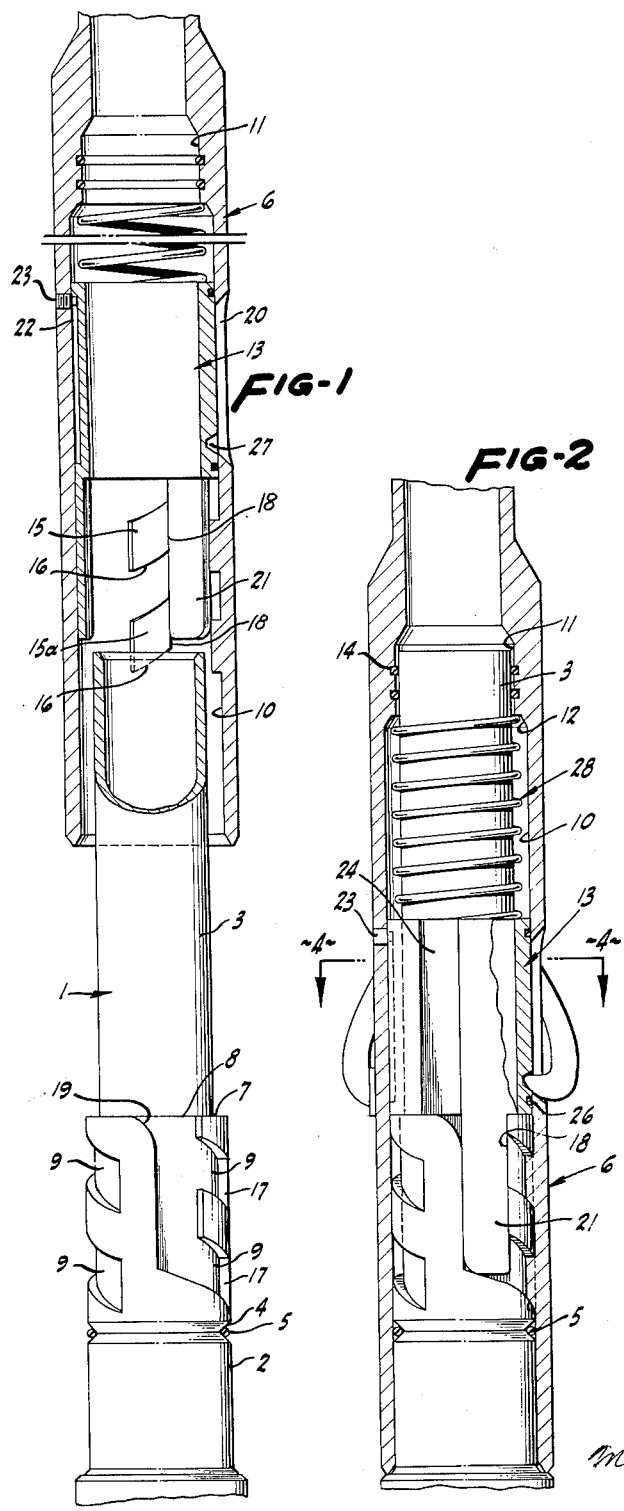

Mellin and Hanscom
ATTORNEYS

United States Patent Office 3,056,614
Patented Oct. 2, 1962

3,056,614
QUICK RELEASE SAFETY TOOL JOINT
AND CONNECTION
Ross A. McClintock, 17051 Santiago Blvd., Orange,
Calif.; Raymond E. Thompson, 121 S. Orchard, Fullerton, Calif.; and Kenneth E. Waggener, 921 E. Elm St.,
Brea, Calif.
Continuation of abandoned application Ser. No. 648,717,
Mar. 26, 1957. This application Dec. 15, 1958, Ser.
No. 780,372
2 Claims. (Cl. 285—39)

This invention relates generally to well drilling equipment, and relates more particularly to a releasable, safety tool joint for use with well drilling equipment.

This application is a continuation of patent application, Serial No. 648,717, filed March 26, 1957 and now abandoned.

In the well drilling industry, it is common practice to employ a drilling string for rotary drilling. These drilling strings are comprised of a number of pipe sections which are connected end to end by tool joint couplings. There are occasions when it is desired to detach and/or reattach portions of the strings to other portions thereof. When, for example, the lower portion of a string becomes jammed or stuck so that it cannot readily be pulled or raised, it is desirable to detach the unfrozen or upper part of the string, thereby enabling that part to be withdrawn and recovered.

In at least one type of off-shore drilling operation, it is essential to disconnect and to connect certain portions of the drilling string at different stages of the operation, and under emergency conditions, such as a sudden storm, it is important that a disconnection be effectuated very quickly. It is a general object of this invention, therefore, to provide a safety type tool joint that will meet the various requirements of the conditions set forth above.

A second object of this invention is to generally improve upon prior art devices of this kind, which are capable of being rapidly and easily connected and/or disassembled from remote points of operation.

It is a further object to provide a tool joint which may be assembled from a remote operational position by merely telescoping the connector parts, and wherein a novel arrangement of parts provides fluid-tight communication through the joint.

Another object of this invention is to provide a tool joint for use in drilling strings wherein no combination of rotational and axial loads on the string can effect a disconnection; wherein a fluid-tight communication is provided through the joint; and wherein the tool joint may be uncoupled by means accessible from without the tool joint.

Other objects and advantages of the invention will be suggested by the description and drawings. After considering the embodiments described herein, persons skilled in the art will understand that variations may be made without departing from the principles disclosed.

Referring to the drawings:

FIG. 1 is a side view of portions of a tool joint embodying the present invention, the mandrel being shown in side elevation, and an adjacent portion of the barrel assembly being shown partly in longitudinal section and separated from the mandrel;

FIG. 2 is another side view of the tool joint shown in FIG. 1, but with both mandrel and barrel assembly partly in section, the mandrel and barrel being assembled;

FIG. 3 is a side view of the key sleeve of the device of FIGS. 1 and 2, showing the sealing groove thereof;

General Description

Figure 6:
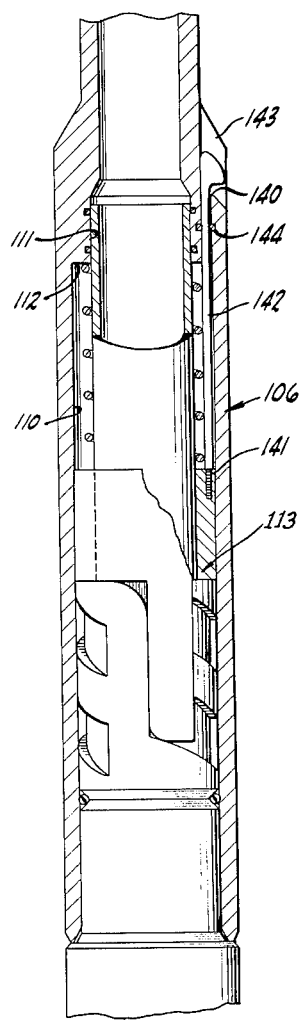
FIG. 6 is a side elevation, partially in section, of another embodiment of this invention.
Figure 4:
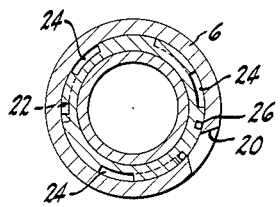
FIG. 4 is a sectional view taken on line 4—4 of FIG. 2.

Each of the tool joints herein described is comprised of a pair of tubular conduit sections, one of which is telescopically received in the other. The outer surface of the inner conduit and the inner surface of the outer conduit are provided with mating camming means which consist of a plurality of helical recesses in one surface and a plurality of camming lugs on the other. A key sleeve, having a plurality of axially extending key appendages, is provided for locking the two sections together. The key appendages mate with axial surface grooves which intersect the helical recesses; and, once the conduit sections are jointed, the key appendages are moved into a locking position which prevents the removal of the camming lugs from the helical recesses, shown in FIG. 2. A resilient biasing means is provided to engage the key sleeve and to urge it into its locking position. If the key sleeve is retracted against the biasing means until the key appendages are removed from the surface locking grooves, the tool joints may be uncoupled by a mere axial separation of the two conduit sections.

In addition, each embodiment of this invention has a novel construction which provides fluid-tight communication through the tool joint, but yet the key sleeve may be retracted by means accessible from without the joint.

Specific Description

Referring now to the form of the invention illustrated in FIGS. 1–5, and more particularly to FIG. 1, the inner conduit section or mandrel 1 comprises a base portion 2 and a reduced diameter sleeve extension 3. The mandrel is preferably secured to the end of a pipe section by welding, but it is to be understood that the mandrel may be formed integrally with the pipe section.

Base portion 2 is provided with an annular groove 4 adjacent the end nearest the pipe section. A sealing ring 5 is disposed in this groove, and it cooperates with the inner surface of the outer conduit section 6, as shown in FIG. 2. The base 2 and extension sleeve 3 join at a shoulder 7, and from this juncture a plurality of axial grooves 8 are formed in the outer surface of the base. The axial grooves are spaced annularly, and while any practical number of grooves may be utilized, the mandrel illustrated is provided with three such grooves spaced at regular intervals (or every 120°). Base 2 is also formed with a camming means comprising one or more helical camming grooves or recesses 9. Each of these grooves begins from an axial groove and extends convolutely about the base. Grooves 8 and 9 thereby form a continuous recess on the outer surface of the mandrel with its origin at shoulder 7 and extending axially therefrom, and then in a helical or inclined path across the outer cylindrical surface of base portion 2. As illustrated, each axial groove 8 may be provided with one or more helical grooves, two such grooves being shown in FIGS. 1 and 2.

The outer conduit section or tubular barrel 6 defines a barrel housing 10 and an inner reduced conduit portion 11 which join at an inner shoulder 12, as shown in FIG. 2. The barrel housing receives the greater portion of the mandrel and also houses a key sleeve 13, described below; and, the reduced conduit portion receives the projected end of extension sleeve 3. Both barrel housing 10 and reduced conduit portion 11 have an inner diameter which is slightly greater than the respective outer diameters of the base portion 2 and extension sleeve 3. A pair of sealing rings 14 is disposed in annular grooves on the inner surface of conduit portion 11 between the outer surface of the extension sleeve. These sealing rings provide a fluid-tight seal between the mandrel and barrel.

A camming means, comprising helically shaped lugs 15, is provided on the inner cylindrical surface of the barrel. These lugs are formed with a helical shape to provide camming surfaces 16 which mate with inclined surfaces of helical grooves 9. One connecting lug is provided for each helical groove formed in the mandrel. Where two helical grooves are provided for each of three axial grooves, as illustrated in FIG. 1, a total of six connecting lugs will be provided on the barrel. These lugs are spaced annularly and axially for cooperative and simultaneous engagement with axial grooves 8 and helical grooves 9. That is, in the embodiment illustrated in FIG. 1, the six lugs required are disposed in pairs on the inner cylindrical surface of barrel housing 10. Each pair of lugs is spaced 120° apart with one lug of each pair axially aligned with the other. It will be noted that with this arrangement each pair of lugs cooperates with the same axial groove, and since each lug is the same size and shape (as are the recesses provided in the mandrel) any one pair of lugs will mate with any one of the recesses.

From the above description, it will be noted that if the respective pairs of lugs are aligned with an axial groove, and if the mandrel and barrel are telescoped together, lugs 15 will pass into the grooves until the most advanced lug 15a will abut against the lower recess. Because of the inclined contours of the mating surfaces, there is effected a relative rotation of the barrel unit and a simultaneous telescoping of parts until the lugs seat themselves against the ends 17 of the recesses. The size of the helical grooves and lugs will be determined such that when the lugs are seated at the ends of the recesses 9, the trailing axial edge 18 of each lug will clear the respective axial groove of each recess.

To enhance the mating of the lugs in the axial grooves, the latter are flared outwardly at the shoulder 7 as indicated at point 19. This will provide an enlarged opening for the axial grooves, and thereby enable a faster and less controlled connection of the barrel to the mandrel.

The barrel housing 10 of FIG. 1 is provided with an oblong opening 20. This opening permits access to the key sleeve 13 and by means of a releasing tool the sleeve may be axially retracted against the biasing means as will be more accurately described. It will be noted, however, that the opening 20 is oblong in the axial direction to expose an outer surface area of the key sleeve during an axial retraction.

Key sleeve 13 is disposed in the barrel housing 10 and is mounted therein for relative reciprocal movement. The sleeve is provided with a plurality of key appendages 21, the same in number as axial grooves provided in the mandrel. As shown, these keys extend axially from the end of the sleeve closest to base 2 and are disposed annularly about the sleeve and at uniformly spaced distances for cooperative engagement with the axial grooves 8. The ends of the keys are rounded on one side to facilitate entrance into the axial grooves.

The outer surface of the key sleeve is axially splined in one or more places 22 for receiving the projecting ends of one or more setscrews 23 in the barrel housing. The axial splines and their cooperating setscrews provide a means to prevent rotation of the sleeve in the barrel but allow limited axial movement therein.

The key sleeve is also provided with a plurality of axial grooves 24, shown in FIGS. 2 and 3. These grooves are annularly spaced to coincide with each pair of lugs 15 on the barrel, and they are of sufficient width to pass the lugs therethrough. This construction permits the insertion or removal of the key sleeve from the open end of the barrel. The camming lugs can then be formed integrally with the barrel or they may be affixed to the barrel before fitting the key sleeve into position. Once the key sleeve is fitted into the barrel and positioned beyond the lugs, the sleeve is rotated such that grooves 24 are no longed aligned with lugs 15. The setscrews 23 are then installed, thereby preventing rotation of the sleeve and confining it in the barrel housing.

An oblong shaped groove 25 is provided on the outer surface of the key sleeve (best shown in FIG. 3) and is of slightly larger size than opening 20 described above. When the key sleeve occupies the locking position, groove 25 will surround opening 20. A sealing ring 26 is disposed in the groove to prevent foreign material from passing into the tool joint when assembled.

A notched recess 27 is formed in the outer surface of the key sleeve and is located in the extremity of groove 25 closest to key appendages 21. The notch is freely accessible from without the barrel through opening 20, and, being located as shown and described, it provides means for retracting the key sleeve to the unlocking position.

When the barrel assembly is disconnected from the mandrel, the key sleeve is urged into abutment with the lugs 15 by a resilient biasing means 28. As shown in FIG. 2, this means comprises a coiled compression spring which seats against the inner shoulder 12 of the barrel and also against the innermost end of the key sleeve. When the joint is assembled, the coils of this spring occupy the cylindrical cavity between extension sleeve 3 and housing 10.

Operation of the tool joint illustrated in FIGS. 1–4 is as follows:

A connection between barrel 6 and mandrel 1 is made simply by bringing the two parts axially together. Sleeve extension 3 will enter the barrel unobstructed until lugs 15 abut the shoulder 7 at an ungrooved portion of the base 2. A slight rotation of the barrel will permit the camming lugs to engage the openings of grooves 8 and move axially therein until the camming surfaces 16 engage the lower edge of the camming recesses. Since the lugs and recesses are inclined, a slight axial pressure on the barrel assembly (or the weight of the string alone) will simultaneously telescope and rotate the lugs into their respective recesses. While the lugs are being received and the mandrel advances into the barrel, the key sleeve 13 is forced into a retracted position by abutment of keys against shoulder 7. When the barrel assembly is fully rotated to the position where the lugs are located in the furthermost part of the recess, keys 21 will then arrive at a position of alignment with the axial grooves. Under the pressure applied by the resilient biasing means 28, the key sleeve will move forward, carrying the keys into a locking position.

To disconnect the tool joint, it is merely necessary to draw axially upon the key sleeve and away from the mandrel. The resilient biasing means is thereby compressed and the keys are retracted from the axial grooves. Continuing to apply the reverse axial pressure to the sleeve will transmit axial pressure to the barrel and, by reverse camming action, the barrel assembly will be rotated and telescoped away from the mandrel.

Figure 5:
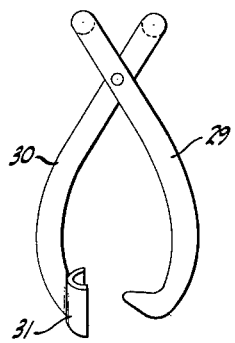
FIG. 5 is a side view of a tool used with the device of FIGS. 1–4 for effecting release of the joint as shown in FIG. 2.

The form of the invention above described is constructed so that a special retracting (or unlocking) tool, shown in FIG. 5, may be used therewith, and opening 20 is provided in barrel 6 for this purpose. This tool operates similarly to ice tongs and comprises a pair of arcuately shaped members 29 and 30 which are pivotally connected. The end of member 29 is pointed and will engage the notch 27. The end of member 30 carries an arcuately shaped plate 31 adapted to slidably engage the barrel at the side opposite opening 20, as shown in FIG. 2.

A second form of this invention is illustrated in FIG. 6, and is structurally similar to that described. This modification is also adapted to be released from the exterior, but the means provided for retracting the key sleeve is different. In this construction, the barrel housing 10 is not provided with an opening 20, nor is the key sleeve provided with a sealing means 25—26 and a notch 27. Like the tool joint previously described, but with particular reference to FIG. 6, barrel 106 defines a barrel housing 110 and an inner reduced conduit portion 111, which join at an inner shoulder 112. An axial bore hole 140 is made through the shoulder 112, thereby providing a passageway and access into the barrel 6 from without. The key sleeve 113 is provided with a tapped bore 141 axially aligned with bore hole 140, and a retracting rod 142 is projected through hole 140 and threadedly connected to the key sleeve. The outer end of rod 142 is shaped into a hook which is housed in a slot 143 formed in the outer casing of the barrel at the opening of bore hole 140. A sealing means 144 is disposed in the bore hole to prevent the entry of foreign matter.

The embodiment of FIG. 6 is in other respects structurally the same as above described, and the coupling is formed by telescoping the parts together. To disconnect the mandrel from the barrel, any suitable tool or connecting line may be used to engage the hooked end of rod 142 and retract the key sleeve. A continuing axial pull on the key sleeve will effectuate disassembly of the tool joint.

Although there are described and illustrated certain preferred embodiments of this invention, it will be understood that the invention is not limited thereto but may be otherwise embodied or practiced within the scope of the appended claims.

Having thus described our invention, what we claim and desire to secure by Letters Patent is:

1. In a joint for coupling pipe sections and the like, a tubular mandrel comprising a base portion and an extension sleeve of lesser diameter, said base having axial grooves intersecting helical camming recesses formed in its outer surface; a tubular barrel including a housing having an inner reduced conduit portion for receiving said extension sleeve, a sealing means circumferentially disposed in said reduced portion for cooperatively engaging the outer surface of said sleeve; helically shaped lugs disposed on the inner surface of said barrel for axial alignment with said axial grooves, said lugs having camming surfaces for cooperatively engaging surfaces of said camming recesses; a tubular key sleeve mounted in said barrel between said lugs and said reduced portion, said key sleeve provided with key appendages extending axially from the end of said sleeve nearest said base and disposed for cooperatively engaging said axial grooves; means engaging said key sleeve and preventing rotation of said sleeve in said barrel but permitting relative axial movement therebetween; and further characterized in that said barrel is provided with an opening in spaced proximity to said lugs, said opening being oblong in the axial direction; said tubular key sleeve also having an oblong-shaped groove formed in its outer surface and disposed for circumscribing said oblong opening, a sealing means seated in said groove, and a tool engagement means formed on the outer surface of said key sleeve and disposed within said oblong groove.

2. In a joint for coupling pipe sections and the like, a tubular mandrel comprising a base portion and an extension sleeve of lesser diameter, said base having axial grooves intersecting helical camming recesses formed in its outer surface; a tubular barrel including a housing having an inner reduced conduit portion for receiving said extension sleeve, a sealing means circumferentially disposed in said reduced portion for cooperatively engaging the outer surface of said sleeve; helically shaped lugs disposed on the inner surface of said barrel for axial alignment with said axial grooves, said lugs having camming surfaces for cooperatively engaging surfaces of said camming recesses; a tubular key sleeve mounted in said barrel between said lugs and said reduced portion, said key sleeve provided with key appendages extending axially from the end of said sleeve nearest said base and disposed for cooperatively engaging said axial grooves; means engaging said key sleeve and preventing rotation of said sleeve in said barrel but permitting relative axial movement therebetween; and further characterized in that said reduced conduit portion of said tubular barrel is smaller in outer cylindrical diameter than said housing, said barrel having an axial bore hole between said conduit portion and said housing, and wherein said tubular key sleeve is provided with an axially extended retracting means projected through said bore hole.

References Cited in the file of this patent

UNITED STATES PATENTS

| | | |
|---|---|---|
| 975,138 | Lancaster | Nov. 8, 1910 |
| 995,966 | Hill | June 20, 1911 |
| 1,113,556 | Hill | Oct. 13, 1914 |
| 1,883,071 | Stone | Oct. 18, 1932 |
| 1,899,469 | Mecom et al. | Feb. 28, 1933 |
| 2,015,786 | Carcano | Oct. 1, 1935 |
| 2,202,261 | Osmun | May 28, 1940 |
| 2,648,553 | Ulrich | Aug. 11, 1953 |
| 2,673,751 | Finch | Mar. 30, 1954 |
| 2,736,384 | Potts | Feb. 28, 1956 |
| 2,804,319 | Weber | Aug. 27, 1957 |
| 2,893,694 | Waggener | July 7, 1959 |
| 2,950,929 | Nicolson | Aug. 30, 1960 |
| 3,023,809 | McClintock | Mar. 6, 1962 |

FOREIGN PATENTS

| | | |
|---|---|---|
| 433,495 | Great Britain | Aug. 15, 1935 |